United States Patent [19]

Jamieson

[11] 3,777,121

[45] Dec. 4, 1973

[54] ELECTRONIC COUNTER

[75] Inventor: Patrick J. Jamieson, Bramalea, Ontario, Canada

[73] Assignee: Rothmans of Pall Mall Canada Limited, Toronto, Ontario, Canada

[22] Filed: Nov. 6, 1972

[21] Appl. No.: 304,212

[52] U.S. Cl. ....... 235/92 EA, 235/92 T, 340/378 R, 328/129, 328/131, 307/215, 307/217, 307/252 F, 307/293

[51] Int. Cl. .......... H03k 5/18

[58] Field of Search .......... 328/129, 130, 131; 340/378 R; 307/215, 217, 252 F, 293; 235/92 EA, 92 T

[56] References Cited

UNITED STATES PATENTS

| | | | |
|---|---|---|---|
| 3,670,209 | 6/1972 | Hensen | 328/131 X |
| 3,684,870 | 8/1972 | Nelson | 235/92 EA |
| 3,705,296 | 12/1972 | Kochi | 235/92 EA |
| 3,721,908 | 3/1973 | Jurjans | 328/131 |

*Primary Examiner*—John S. Heyman
*Attorney*—Peter W. McBurney et al.

[57] ABSTRACT

An electronic counter is provided with a built-in timer and is fabricated primarily of logic gates having a NAND function. Two of these gates are cross-connected in such a way that one of them is latched so as not to change its output while a timing cycle is taking place. The presence of the timer enables the counter to give a direct readout in RPM, for example.

9 Claims, 11 Drawing Figures

ELECTRONIC COUNTER

CROSS-REFERENCE TO RELATED APPLICATION

The invention described herein is related to the invention described in copending patent application Ser. No. 304,225 filed Nov. 6, 1972.

BACKGROUND OF THE INVENTION

This invention relates to electronic counters. More particularly, this invention relates to electronic counters having built-in timers.

There are many different types of electronic counters available on the market at the present time. Some of these counters even have built into them timers which enable the counters to count input pulses applied to the counters over some predetermined time interval. However, counters of this type generally are quite expensive and have varying degrees of accuracy.

SUMMARY OF THE INVENTION

In accordance with this invention, there is provided an electronic counter containing a built-in timer, which counter is fabricated primarily of logic gates and which is relatively inexpensive and quite compact. In a preferred embodiment of the invention a very simple and inexpensive but highly accurate timer of the type disclosed in detail in the aforementioned copending patent application is employed, although other types of timers could be used if desired. In any event, the counter incorporates a latching network which ensures that when a timed count has been started, it is permitted to be completed without interruption. As a counter embodying this invention includes a timer, it is capable of counting and giving a direct readout in RPM, for example. Thus, if a rotating shaft is arranged to close a microswitch once each revolution, and a pulse is generated on each closure of the switch and applied to the counter, it is possible to count shaft RPM by setting the timer to one minute, in which event the number of pulses counted during that minute will be a precise measure of shaft RPM.

BRIEF DESCRIPTION OF THE DRAWINGS

This invention will become more apparent from the following detailed description, taken in conjunction with the appended drawings, in which.

DESCRIPTION OF THE PREFERRED EMBODIMENT

Figure 1:
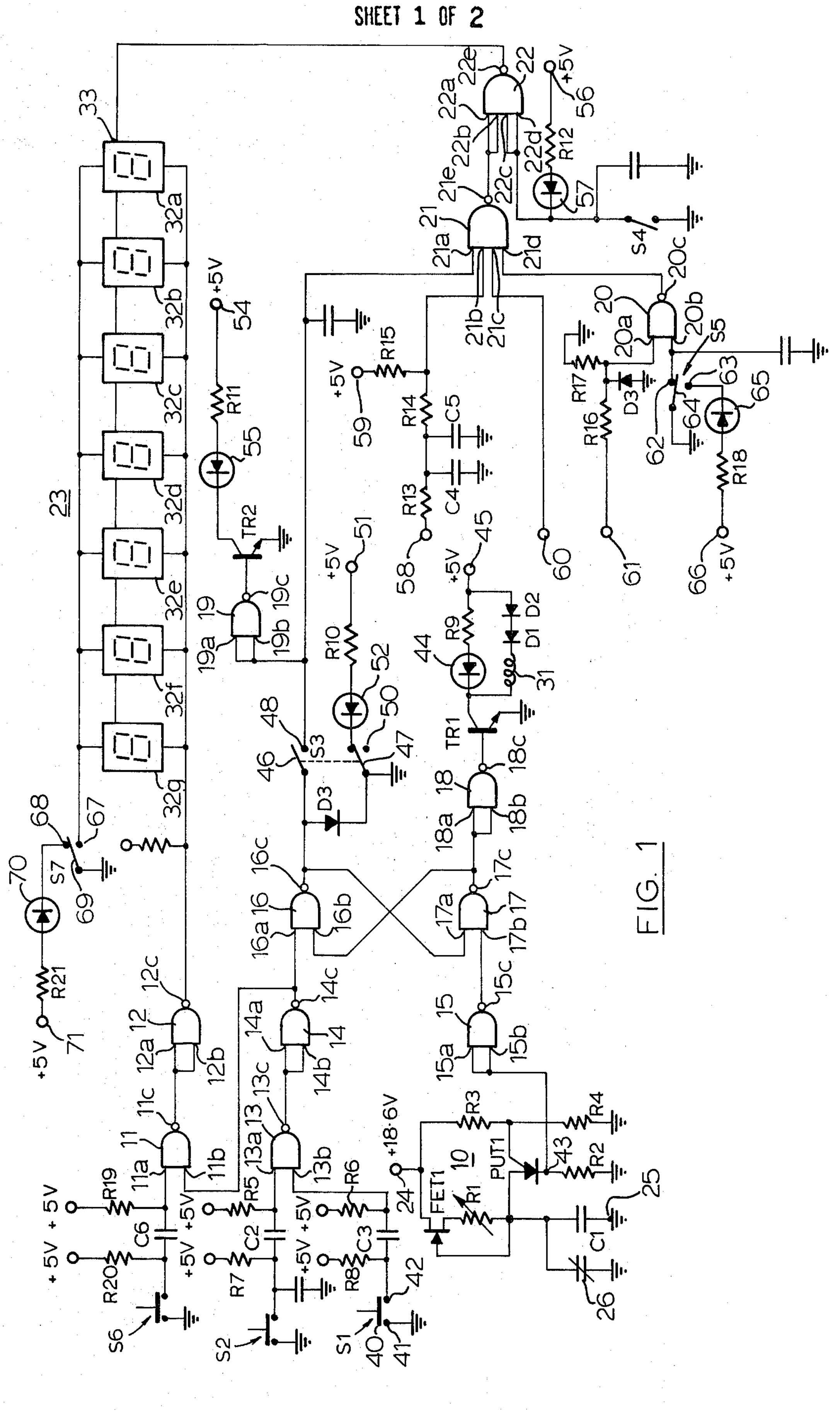
FIG. 1 is a circuit diagram of an electronic counter constituting a preferred embodiment of this invention.

Referring to FIG. 1, the counter shown therein consists basically of a timer 10, a plurality of NAND gates 11 to 20 inclusive, two Schmitt trigger circuits 21 and 22, a readout-counter device 23 and additional components which will be referred to hereinafter.

Timer 10 includes a conventional RC timing network composed of a variable resistor R1 and a capacitor C1, but connected in series therewith are the drain and source electrodes of a junction field effect transistor FET1. Transistor FET1, resistor R1 and capacitor C1 are connected in series circuit between a terminal 24 at a positive DC potential, say, +18.6 volts, and a terminal 25 at ground potential.

The common terminal of capacitor C1 and resistor R1 is connected to the gate of transistor FET1, and the contacts 26 of a relay having a coil 31 are connected across capacitor C1.

The anode electrode of a programmable unijunction transistor PUT1 is connected to the common terminal of resistor R1 and capacitor C1. A resistor R2 is connected between the cathode of transistor PUT1 and ground.

Resistors R3 and R4 are connected in voltage divider relationship between terminal 24 and ground with their common terminal being connected to the gate of transistor PUT1. The relative values of resistors R3 and R4 and the magnitude of the DC potential at terminal 24 determine the firing point of transistor PUT1, i.e., it will fire when the voltage at its anode reaches the voltage at its gate.

Figures 2, 3, 4, 5, 6, 7, 8, 9, 10, 11:
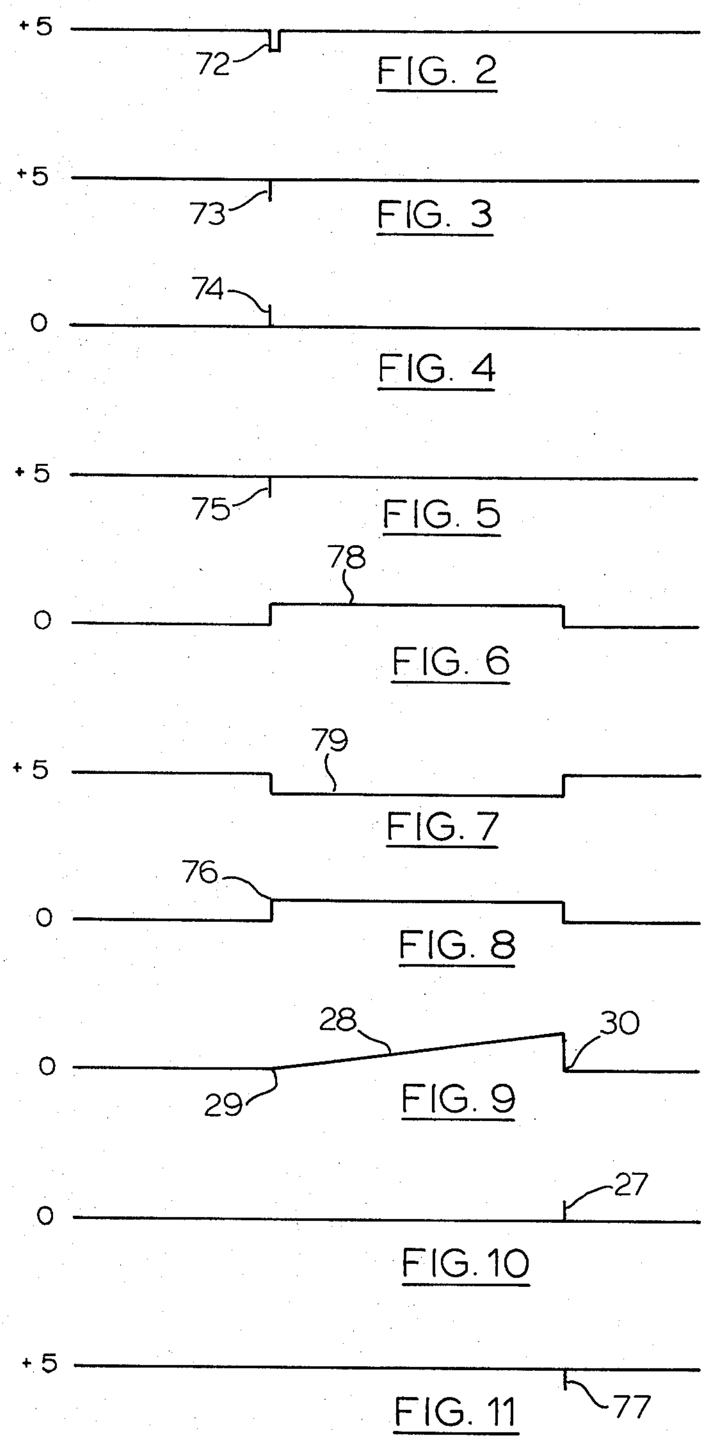
FIG. 2 – 11 are timing diagrams, each plotted on a scale of volts against time, that are useful in describing the operation of the counter of FIG. 1.

The operation of timer 10 is described in detail in the aforementioned copending patent application to which reference may be made for a more detailed description and circuit analysis than will be presented herein. In brief, however, when relay contacts 26 are open, timing is initiated with capacitor C1 charging via resistor R1 and transistor FET1. When the voltage across capacitor C1 reaches the voltage at the gate of transistor PUT1, transistor PUT1 will fire causing a positive-going pulse 27 (FIG. 10) to be developed across resistor R2. The build-up of voltage on the anode of transistor PUT1 is shown at 28 in FIG. 9. In FIG. 9 reference numeral 29 designates the point in time at which relay contacts 26 open to initiate timing, and reference numeral 30 designates the point in time at which the anode and gate voltages of transistor PUT1 become equal.

The effect of transistor FET1 is, by virtue of providing a constant charging current, to linearize the voltage developed across capacitor C1 during charging thereof, as explained in the aforementioned copending patent application, so that the voltage developed across capacitor C1 becomes a linear rather than an exponential function of time, as may be seen by referring to FIG. 9. The net result is that pulse 27, which is a timing pulse, is developed at a precise and repeatable interval of time after timing has been initiated. As will be seen hereinafter, the occurrence of pulse 27 causes the deenergization of coil 31 and the closing of contacts 26. This inhibits timer 10, as capacitor C1 cannot charge when contacts 26 are closed.

While a counter embodying this invention preferably employs a timer 10 of the type hereinbefore described, it will be appreciated that other timers may be substituted therefor.

Readout-counter device 23 is essentially a conventional device known as a seven segment counter decoder driver. The segments making up the device are sold by Texas Instruments under part no. TIXL306. Each of the seven segments 32*a* to 32*g* inclusive includes a plurality of light emitting diodes (LED) arranged to form a figure eight. By the illumination of selected ones of the LEDs of any segment, any number from 0 to 9 can be displayed. The pulses to be counted are supplied to the input terminal 33 of readout-counter device 23, are continuously counted thereby and the continuous count numerically displayed. The arrangement of the segments of the device is such that segment 32a will count from 0 to 9, revert to 0 and then continuously repeat this cycle. At the time of reversion to 0, segment 32*b* will change its display from 0 to 1 and so on, so that the first segment counts units, the second tens, the third hundreds, etc.

Those skilled in the art will appreciate that other readout-counter devices may be substituted for readout-counter device 23 if desired.

The other components of the counter now will be described. However, before this description commences, it is important to understand the function of a NAND gate. A NAND gate is a logic gate having a plurality of input terminals and an output terminal. What are commonly referred to as high and low signals are applied to its input terminals. Usually a low signal is 0 volts and a high signal is some positive DC voltage. It is characteristic of a NAND gate that when all of the inputs thereto are high, the output will be low; when all of the inputs are low, the output will be high; and when any input is high, the other or others being low, the output will be high. Thus, for a NAND gate having four input terminals, the output will be high under any of the following conditions: all inputs low; two inputs high and two inputs low; one input low and three inputs high; and three inputs low and one input high. The output will be low only if all inputs are high. While in this description reference will be made to high and low signal levels, it will be understood that signals at these two different levels can be and are conventionally referred to as 1 and 0 signal levels. These symbols represent two different signal levels. The actual values thereof are determined by the system itself. In the counter disclosed herein the 1 signal is +5 volts and the 0 signal is 0 volts, but these values are arbitrary, and in another system the 0 signal could be +4 volts, say, and the 1 signal 0 volts, for example.

Since it is possible using suitable arrangements of other logic gates, such as NOR gates, for example, to create a device that will functionally duplicate a NAND gate, it is to be understood that where herein reference is made to a logic gate having a NAND function, what is meant is a logic gate having the characteristics noted previously herein of a NAND gate, as well as a NAND gate itself.

NAND gates 11–13 and 20 are packaged together, as are NAND gates 14–17. These packaged integrated circuits are sold by Texas Instruments under No. SN7400, although as aforementioned other logic gates having a NAND function may be used.

Associated with NAND gate 18 is a transistor TR1. These components are constituted by an integrated circuit, just as are NAND gate 19 and transistor TR2 associated therewith. These integrated circuits are sold by Texas Instruments under S.N. 75,451. Other NAND gate, driver transistor packages or equivalent networks could be used, however.

As each NAND gate has two input terminals and an output terminal, these will be designated using the same reference numerals as for the NAND gates themselves plus the letters *a* and *b* for the two input terminals and the letter c for the output terminal.

Input terminals 13a and 13b normally have high inputs being connected via resistors R5 and R6 respectively to a source of positive DC voltage, say, +5 volts. A resistor R7 and a capacitor C2 constitute a differentiating network connected to input terminal 13a, just as a resistor R8 and a capacitor C3 constitute a differentiating network connected to input terminal 13b. Capacitor C2 is connected between the two lower terminals of resistors R5 and R7 with the common terminal of resistor R5 and capacitor C2 being connected to input terminal 13*a*. The other terminal of resistor R7 is connected to a source of positive DC potential, say, +5 volts. Capacitor C3, resistors R8 and R6 and input terminal 13*b* are connected in the same way as capacitor C2, resistors R7 and R5 and input terminal 13*a*. A timer start switch S1 has a movable contact 40 and fixed contacts 41 and 42. The former is connected to a source of suitable DC potential, ground potential in the Figure, while the latter is connected to the common terminal of resistor R8 and capacitor C3. A remotely located switch S2 connected like switch S1 but in circuit with input terminal 13a is provided for remote starting of timer 10.

Output terminal 13*c* is connected to both input terminals 14*a* and 14*b*. Output terminal 14*c* is connected to input terminal 16*a*. Output terminal 16*c* is connected to input terminal 17*a*. Output terminal 17*c* is connected to input terminal 16*b*.

The output terminal 43 of timer 10 is connected to both input terminals 15*a* and 15*b*. Output terminal 15*c* is connected to input terminal 17*b*.

Output terminal 17*c* is connected to input terminals 18*a* and 18*b*. Output terminal 18*c* is connected to the base of transistor TR1.

Connected between a terminal 45 at a positive DC potential, say, +5 volts and the collector of transistor TR1 is a resistor R9 and an LED 44. The latter provides a visual indication when timer 10 is timing (timer in). Also connected between terminal 45 and the collector of transistor TR1 are two forward biased diodes D1 and D2 and relay coil 31. The emitter of transistor TR1 is connected to a source of suitable DC potential, ground potential in the figure.

A timer-on switch S3 has two movable contacts 46 and 47 ganged together and three fixed contacts 48, 49 and 50. Output terminal 16c is connected to contact 46 and via a diode D3 to contact 49. Contact 47 is connected to a source of suitable DC potential, ground potential in the Figure. Connected between a terminal 51 at a suitable DC potential, say, +5 volts and terminal 50 is a resistor R10 and an LED 52. When contacts 47 and 50 are engaged, LED 52 becomes illuminated to provide a visual indication that timer 10 is on, although not necessarily timing.

Contact 48, and hence, when switch S3 is closed, output terminal 16*c*, is connected to input terminals 19*a* and 19*b*. Output terminal 19*c* is connected to the base of transistor TR2. Connected between a terminal 54 at a suitable DC potential, say, +5 volts, and the collector of transistor TR2 is a resistor R11 and an LED 55. When illuminated, the latter provides a visual indication that timer 10 is not timing (timer out). The emitter of transistor TR2 is connected to a source of suitable DC potential, ground potential in the Figure.

Schmitt trigger circuit 21 has four input terminals 21*a*, 21*b*, 21*c* and 21*d* and one output terminal 21*e*. Schmitt trigger circuit 22 has four input terminals 22*a*, 22*b*, 22*c* and 22*d* and one output terminal 22*e*, the latter being connected to input terminal 33. It should be noted that Schmitt trigger circuits 21 and 22 are NAND gates that additionally provide a pulse shaping function. If the pulses applied to input terminals 21*a* – 21*d* do not require shaping, ordinary NAND gates may be used in place of the Schmitt trigger circuits. Output terminal 21*e* is connected to input terminals 22*a* and 22*b*. Input terminals 22*c* and 22*d* are connected to an inhibit switch S4 which, when closed, connects these terminals to a source of suitable DC potential, ground potential in the Figure. Connected between inhibit switch S4 and a terminal 56 at a suitable DC potential, say, +5 volts are a resistor R12 and an LED 57 that becomes illuminated when inhibit switch S4 is closed. The inhibit switch is closed when it is desired to stop internal counting but hold the numerical display of readout-counter device 23. If an inhibit function is not required, Schmitt trigger circuit 22 can be omitted.

Contact 48 is connected to input terminal 21*a*, as is output terminal 16*c* when switch S3 is closed.

Pulses to be counted may be supplied to any one of input terminals 21*b* – 21d. Thus a switch input terminal 58 is conneted to input terminal 21b via a filter network consisting of resistors R13 and R14 and capacitors C4 and C5, resistors R13 and R14 being connected in series between terminals 58 and 21b and capacitors C4 and C5 being connected between the common terminal of resistors R13 and R14 and a terminal at a suitable DC potential, ground potential in the Figure. Input terminal 21b also is connected via a resistor R15 to a terminal 59 at a suitable DC potential, say, +5 volts. Terminal 58 is connected to a normally open switch which, when closed, effectively grounds input terminal 21*b*. When the switch is open, however, the input signal to input terminal 21*b* is high, so the repeated opening and closing of the switch, which may be effected by rotating machinery or the like, applies pulses to input terminal 21*b* that can be counted and displayed.

Input terminal 21*c* is connected to a signal input terminal 60 to which pulses to be counted may be applied. When no signal is applied to terminal 60, it floats in potential, and this is equivalent to a high input to Schmitt trigger circuit 21.

Output terminal 20*c* is connected to input terminal 21d. Input terminal 20*a* is connected via a resistor R16 to an input terminal 61 to which a test signal, e.g., a 60 Hz sine wave, is applied continuously. A resistor R17 is connected in voltage divider relationship with resistor R16. A diode D3 is connected between ground and the common terminal of resistors R16 and R17. It functions to essentially short circuit the negative-going portions of the aforesaid 60 Hz signal.

Input terminal 20*b* is connected to one fixed contact 62 of a switch S5 that has another fixed contact 63 and a movable contact 64. The latter is grounded. The former is connected via an LED 65 and a resistor R18 to a terminal 66 at a suitable DC potential, say, +5 volts.

When switch S5 is in the position shown in the Figure the signal level applied to input terminal 20*b* is low, while the signal level of input terminal 20*a* is alternately high and low. Output terminal 20*c* thus remains high. When it is desired to test the counter, movable contact 64 is engaged with fixed contact 63 causing LED 65 to illuminate to indicate that a 60 Hz test is underway. Input terminal 20*b*, because it floats, is at a high signal level under these circumstances, while input terminal 20*a* continues to alternate between a high and low signal level. Under these circumstances the signal level at output terminal 20*c* and hence at input terminal 21*d* alternates between high and low. The number of pulses that occur during any predetermined time interval can be counted, and since the frequency of the test signal is known, the accuracy of the counter can be readily determined.

NAND gates 11 and 12 constitute part of the circuitry for clearing readout-counter device 23. Connected to input terminal 11*a* in the same configuration as the components that are connected to input terminal 13*b* are two resistors R19 and R20, a capacitor C6 and a switch S6. Input terminal 11*b* is connected to output terminal 14*c*. Output terminal 11*c* is connected to input terminals 12*a* and 12*b*. Output terminal 12c is connected to each segment 32*a* – 32*g*. Readout-counter device 23 is cleared automatically each time switch S1 or S2 is closed by virtue of the connection between output terminal 14c and input terminal 11*b*. It also may be cleared manually at any time by closing switch S6.

Each segment 32*a* – 32*g* also is connected to one fixed contact 67 of a switch S7 having another fixed contact 68 and a movable contact 69. The latter is grounded. The former is connected via an LED 70 and a resistor R21 to a terminal 71 at a suitable DC potential, say, +5 volts. When switch S7 is in the position shown in the Figure, readout device 23 is latched, as indicated by the illumination of LED 70, so that the numerical display remains constant, although internal counting continues. When movable contact 69 engages fixed contact 67, the numerical display advances to the proper count and then changes with the count.

In order to describe the operation of the counter, it will be assumed that all of the switches S1 – S6 are in the positions thereof shown in the Figure, and that switch S7 is in the position in which readout-counter device 23 is unlatched. It also will be assumed that relay contacts 26 are closed.

The function that is served by Schmitt trigger circuits 21 and 22 is that of shaping the pulses to be counted that are applied thereto and operating as NAND gates.

With switch contact 46 in the position shown in the Figure, input terminal 21*a* floats and is at a high signal level. With no input signals applied to terminals 58 and 60, input terminals 21*b* and 21*c* are at high signal levels, and with switch S5 in the position shown in the Figure, input terminal 21d is at a high signal level. With a signal applied to input terminal 60, or with switch S5 in its 60 Hz test position, or with a switch connected to input terminal 58 being opened and closed, the signal levels at input terminals 21*c*, 21*d* and 21*b* respectively will be alternately high and low, making the signal levels at input terminals 22*a* and 22*b* alternately high and low. The signal levels at input terminals 22*c* and 22*d* are both high when switch S4 is open, so the signal level at output terminal 22*e* alternates between high and low, and the resultant pulses are counted and displayed by readout-counter device 23.

It now will be assumed that it is desired to count the pulses applied to input terminal 60 for a period of time that is predetermined by timer 10 and that preferably is one minute. This is accomplished by moving switch S3 to the timer on position and closing one of switches S1 and S2. When switch S3 is so moved, LED 52 illuminates to indicate that the timer is on (but not in), and output terminal 16*c* is connected to input terminal 21*a*.

When switches S1 and S2 are open, the signal levels at both input terminals 13*a* and 13*b* are high. When switch S1 is closed momentarily, the signal level at the bottom terminal of resistor R8 goes low for the length of time that switch S1 remains closed. This is shown at 72 in FIG. 2. The negative-going pulse 72 is differentiated and results in a low signal level in the form of a sharp negative-going pulse 73 (FIG. 3) at input terminal 13*b*. If switch S2 had been closed rather than switch S1, the signal level at input terminal 13*a* would have gone low, while the signal level at input terminal 13*b* would remain high. With high and low signal levels at its input terminals, the signal level at output terminal 13c of NAND gate 13 is high, and both input terminals of NAND gate 14 are at high signal levels, making the signal level at output terminal 14*c* low, as shown at 75 in FIG. 5.

The signal level at input terminal 11*a* with switch S6 open is high, while the signal level at input terminal 11*b* is low, resulting in a high signal level at output terminal 11*c* and input terminals 12*a* and 12*b* and a low signal level at output terminal 12*c*. This clears readout device 23.

The signal level at input terminal 16*a* is low, while the signal level at output terminal 16*c* is high, as shown at 74 in FIG. 4, resulting in a high signal level at input terminal 17*a*.

When switch S1 (or switch S2) is closed, the signal level at input terminals 15*a* and 15*b* is low, and the signal level at output terminal 15*c* and input terminal 17*b* thus is high. Thus the signal level at output terminal 17*c* and input terminal 16*b* is low.

The presence of a low signal level at input terminal 16*b* insures that the signal level at output terminal 16*c* remains high for the duration of timing even after switch S1 is released. In other words, NAND gate 16 is latched by NAND gate 17. Thus, when switch S1 reverts to its open state, the signal level at both input terminals 13*a* and 13*b* is high, resulting in a low signal level at output terminal 13*c* and input terminals 14*a* and 14*b* and a high signal level at output terminal 14*c* and input terminal 16*a*. But with a low signal level at input terminal 16*b*, the signal level at output terminal 16*c* remains high. Even if one of switches S1 or S2 should be accidentally closed after timing has been started, the signal level at output terminal 16c remains high.

With a low signal level at output terminal 17*c*, and hence at input terminals 18*a* and 18*b*, the signal level at output terminal 18*c* is high, rendering transistor TR1 conductive. When transistor TR1 is conductive, current flows through LED 44 illuminating the same to indicate that timer 10 is in and through coil 31 of the relay, as indicated at 76 in FIG. 8. The flow of current through coil 31 opens relay contacts 26 and initiates charging of capacitor C1 and commencement of timing. After a time which is predetermined by the components of timer 10 and which can be varied by varying the resistance of resistor R1, transistor PUT1 fires (at point 30 in FIG. 9), and the signal level at input terminals 15*a* and 15*b* changes from low to high as a result of the voltage developed across resistor R2 when transistor PUT1 fires. The high signal level is shown at 27 in FIG. 10. The signal level at output terminal 15*c* changes to low, as shown at 77 in FIG. 11, changing the signal level at output terminal 17*c* to high. Since the signal level at input terminal 16*a* has reverted to high, since switch S1 is closed only momentarily, as explained previously herein, and since the signal level at input terminal 16*b* now is high as well, the signal level at output terminal 16*c* changes to low. Thus as shown at 79 in FIG. 7, the signal level at output terminal 17*c* remains low from the time relay contacts 26 are opened until transistor PUTI fires, while the signal level at output terminal 16*c* remains high, as shown at 78 in FIG. 6, for this same interval.

When the signal level at output terminal 17*c* changes to high, the signal level at output terminal 18*c* changes to low, cutting off transistor TR1. Current ceases to flow through LED 44, signalling the end of the timing operation. Current ceases to flow through coil 31, so contacts 26 close preventing further charging of capacitor C1.

During timing the signal level at output terminal 16*c* is high, as is the signal level at input terminals 19*a* and 19*b*. The signal level at output terminal 19*c* thus is low, and transistor TR2 is held cut off. However, at the end of the timing operation, the signal level at output terminal 16*c* and at input terminals 19*a* and 19*b* changes to low. The signal level at output terminal 19*c* changes to high, and transistor TR2 is rendered conductive. Current flows through LED 55 illuminating the same to indicate that the timer is out.

Thus, during timing the signal level at output terminal 16*c* and input terminal 21*a* remains high, as shown at 78 in FIG. 6. Pulses applied to input terminals 21*b* or 21*c* during timing will pass through the Schmitt trigger circuits to input terminal 33 and will be counted and displayed by readout-counter device 23. The same applies to pulses appied to input terminal 20a when movable contact 64 is engaged with fixed contact 63. As soon as the signal level at input terminal 21a drops to low at the end of a timing cycle, counting ceases.

If it is desired to stop the count at any time and yet retain the numerical display of the count to that point in time, inhibit switch S4 may be closed, making the signal levels at input terminals 22*c* and 22*d* low, which inhibits changes in the signal level at output terminal 22*e* notwithstanding changes in the signal levels applied to terminals 22*a* and 22*b*.

If it is desired to continue the count but stop the display of the count, switches S4 and S7 should be moved to the positions shown in the Figure.

If it is desired to clear the readout-counter device 23 at any time, switch S6 should be depressed momentarily.

While a preferred embodiment of this invention has been described herein, changes and modifications may be made therein without departing from the spirit and scope of the invention as defined in the appended claims.

What I claim as my invention is:

1. An electronic counter comprising first, second, third, fourth, fifth and sixth logic gates each having a NAND function, each of said logic gates having first and second input terminals and an output terminal; a timer having an output terminal at which a 1 pulse signal is developed after a predetermined timing interval following commencement of a timing cycle by said timer and at which a 0 signal is developed at all other times, said 0 and 1 signals being signals at two different voltage levels; a readout-counter device having an input terminal and constructed and arranged to count and display the number of pulses applied to said input terminal thereof; means connecting said output terminal of said first logic gate and said input terminals of said second logic gate for applying 0 and 1 signals developed at said output terminal of said first logic gate to said input terminals of said second logic gate; means connecting said output terminal of said second logic gate and said first input terminal of said third logic gate for applying 0 and 1 signals developed at said output terminal of said second logic gate to said first input terminal of said third logic gate; means connecting said output terminal of said third logic gate and said first input terminal of said fourth logic gate for applying 0 and 1 signals developed at said output terminal of said third logic gate to said input terminal of said fourth logic gate; means connecting said output terminal of said fourth logic gate and said second input terminal of said third logic gate for applying 0 and 1 signals developed at said output terminal of said fourth logic gate to said second input terminal of said third logic gate; means connecting said output terminal of said timer and said input terminals of said fifth logic gate for applying said 0 and 1 signals developed at said output terminal of said timer to said input terminals of said fifth logic gate; means connecting said output terminal of said fifth logic gate and said second input terminal of said fourth logic gate for applying 0 and 1 signals developed at said output terminal of said fifth logic gate to said second input terminal of said fourth logic gate; means connecting said output terminal of said third logic gate and said first input terminal of said sixth logic gate for applying 0 and 1 signals developed at said output terminal of said third logic gate to said first input terminal of said sixth logic gate; means connecting said output terminal of said sixth logic gate and said input terminal of said readout-counter device for supplying pulses to be counted to said input terminal of said readout-counter device; means for applying 0 and 1 signals to said second input terminal of said sixth logic gate to develop pulses to be counted at said output terminal of said sixth logic gate; means for applying 0 and 1 signals to said first input terminal of said first logic gate; means for applying at least 1 signals to said second input terminal of said first logic gate; and means responsive to a 0 signal at said output terminal of said fourth logic gate for commencing a timing cycle of said timer and for terminating said timing cycle responsive to a 1 signal at said output terminal of said fourth logic gate.

2. The invention according to claim 1 wherein said sixth logic gate is a Schmitt trigger circuit.

3. The invention according to claim 1 wherein said means connecting said input terminal of said sixth logic gate and said input terminal of said readout-counter device comprises a seventh logic gate having a NAND function and having first and second input terminals and an output terminal, means connecting said output terminal of said sixth logic gate and said first input terminal of said seventh logic gate for applying 0 and 1 signals developed at said output terminal of said sixth logic gate to said first input terminal of said seventh logic gate, and means connecting said output terminal of said seventh logic gate, and said input terminal of said readout-counter device for applying pulses to be counted developed at said output terminal of said seventh logic gate to said input terminal of said readout-counter device; and means for applying 0 and 1 signals to said second input terminal of said seventh logic gate.

4. The invention according to claim 3 wherein said seventh logic gate is a Schmitt trigger circuit.

5. The invention according to claim 1 wherein said means connecting said output terminal of said third logic gate and said first input terminal of said sixth logic gate includes a switch.

6. The invention according to claim 1 wherein said means for applying 0 signals to said first input terminal of said first logic gate includes a switch.

7. The invention according to claim 1 including a relay having a coil and contacts, said means responsive to 0 and 1 signals at said output terminal of said fourth logic gate comprising said coil and contacts and a circuit including said coil through which current can flow, said circuit including a device that is conductive and renders said circuit conductive in response to one of said signals being developed at said output terminal of said fourth logic gate and that is non-conductive and renders said circuit non-conductive in response to the other of said signals being developed at said output terminal of said fourth logic gate, said timer including a timing capacitor that charges during said timing cycle, said relay contacts being connected in parallel with said timing capacitor and preventing charging thereof when closed.

8. The invention according to claim 7 wherein said device is a transistor.

9. The invention according to claim 1 wherein said logic gates are NAND gates.

* * * * *